May 16, 1933.  A. W. HINCHLIFFE  1,909,861
SYSTEM FOR FEEDING VINEGAR GENERATORS OR THE LIKE
Original Filed June 17, 1929  2 Sheets-Sheet 1
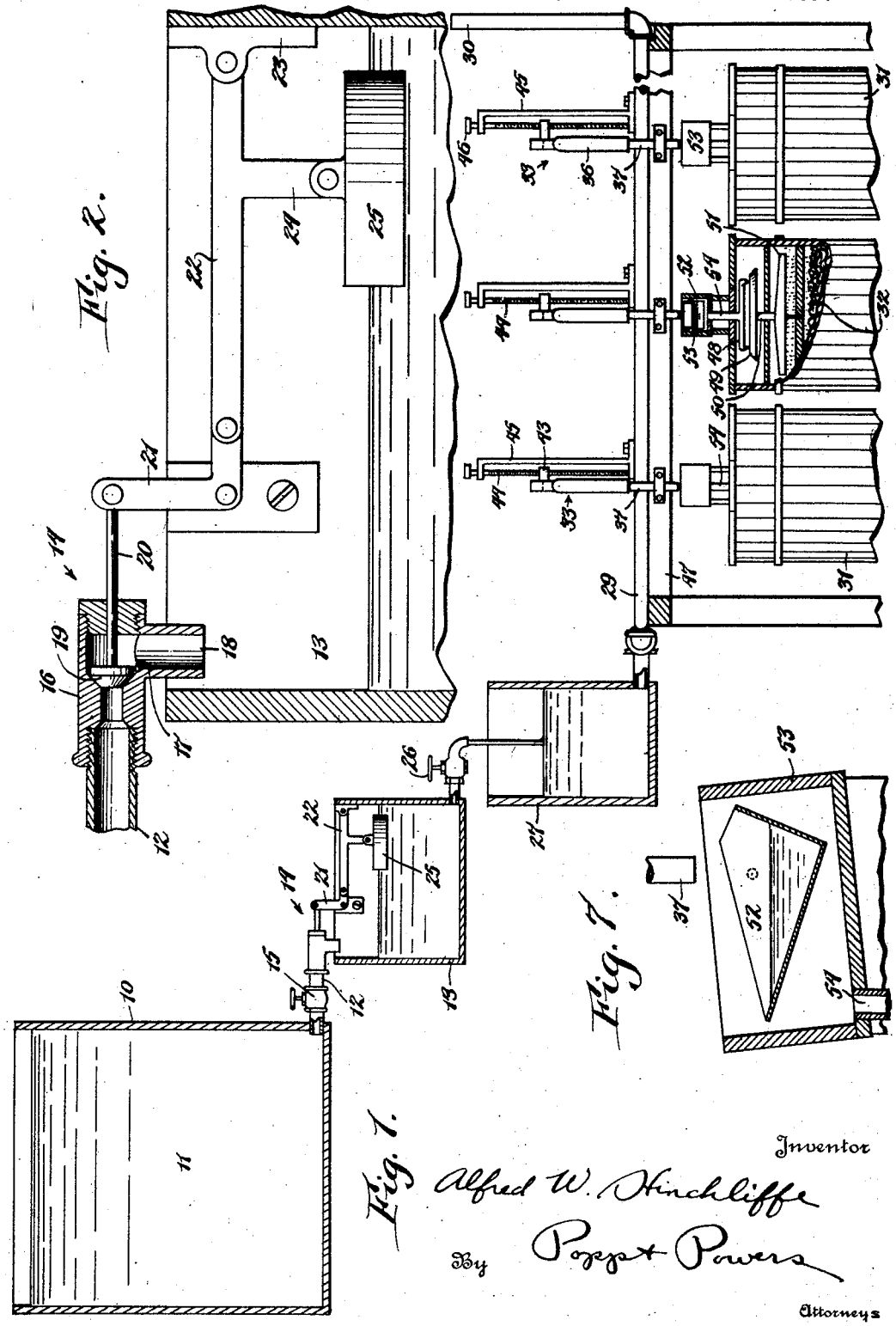
Inventor
Alfred W. Hinchliffe
By Popper + Powers
Attorneys

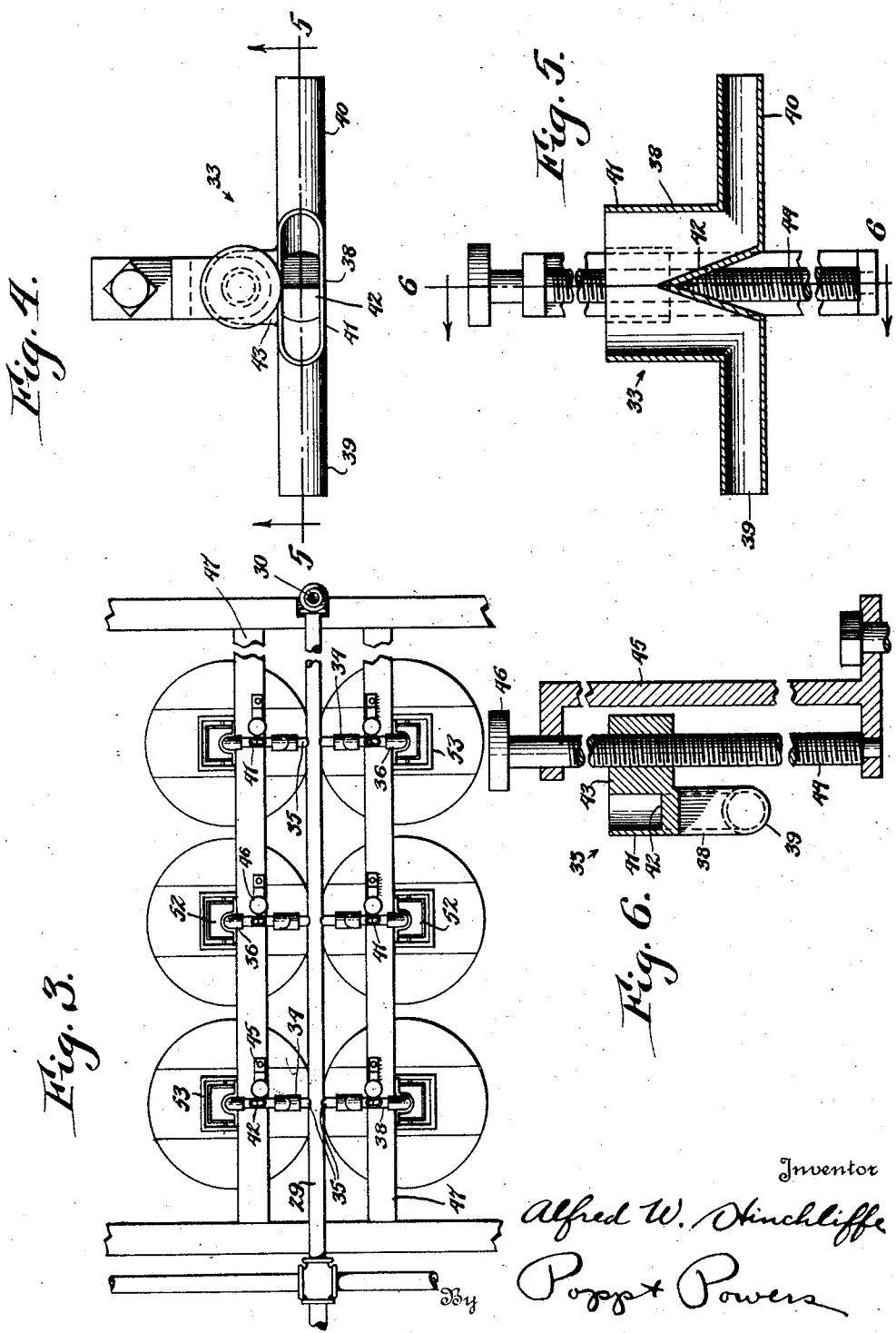

Patented May 16, 1933

1,909,861

UNITED STATES PATENT OFFICE

ALFRED W. HINCHLIFFE, OF BUFFALO, NEW YORK, ASSIGNOR TO ALFRED R. PAGE, OF NEW YORK, N. Y.

SYSTEM FOR FEEDING VINEGAR GENERATORS OR THE LIKE

Application filed June 17, 1929, Serial No. 371,337. Renewed September 19, 1932.

This invention relates to a system for controlling the feeding of vinegar generators and more particularly to an open flow liquid level system by which the flow of cider to the generators is accurately controlled, although the invention may also be employed for other uses where exact and uniform feeding of liquids to a plurality of generators or the like is necessary.

As is well known, the continued accurate feeding of exact quantities of cider to vinegar generators is of prime importance in the production of good vinegar at low cost.

In the large scale production of vinegar, the alcoholic cider or liquor is allowed to trickle over beech wood shavings or the like which are contained in a generator and are impregnated with bacteria which convert the passing alcohol into acetic acid and thereby convert the alcoholic cider into vinegar. The bacteria convert the alcohol at a constant rate and if too great a quantity of cider is passed through the generator in a given time, it is apparent that the excess quantity of alcohol will not be acted on and will pass through the generator and mix with the vinegar thereby not only effecting a loss of acetic acid but also giving the vinegar an undesirable alcoholic content. If, on the other hand, the cider is run too slow, the bacteria act on the converted acetic acid and form carbon dioxide and water. It is therefore of prime importance that the flow of cider through the generator be maintained accurately at the precise rate at which the bacteria convert the alcohol in order to secure the maximum yield of acetic acid and the best quality of vinegar.

In systems for supplying cider to standard vinegar generators, now in use, a float valve in a float valve tank is employed in an attempt to maintain a constant head of cider and the flow of cider to the generators is regulated by individual spigots or valves. The attendant sets the individual spigots at approximately the desired flow which is not maintained for the following reasons. In actual practice, the head of vinegar in the float valve tank varies within certain limits and this, combined with the fact that the generator spigots "mother up" and vary in flow through sediment deposits causes a decided variation in the amount fed to the different generators with consequent alcoholic and acetic acid losses. With a large number of generators, it is impossible to keep all of the generator spigots adjusted to the correct flow, the feeding of the generators is irregular and a substantial quantity of alcohol passes through the generators unconverted.

The principal object of the present invention is to provide a system for controlling the flow of cider to vinegar generators which can be accurately set at the desired flow and when so set will maintain this flow without deviation, thereby securing the maximum conversion of the alcohol into acetic acid.

A further object is to provide such a system in which the "mother of vinegar" will not readily accumulate and which can be readily cleaned thereby permitting of maintaining the system in the most sanitary condition.

A further aim is to provide such a feeding system for generators which can be quickly and easily set by one not particularly skilled.

Other aims are to provide a simple and inexpensive system which will operate reliably to feed accurate quantities of cider and will not get out of order through constant use.

In the accompanying drawings:

Figure 1 is a vertical section through the storage tank, float valve tank, master control tank and battery of generators.

Figure 2 is a vertical section through the multiplying leverage float valve controlling the level of cider in the float valve tank fed from the main storage tank.

Figure 3 is a top plan view of the battery of generators shown in Fig. 1.

Figure 4 is a detached top plan view of the adjustable overflow valve used for individually regulating the flow of cider to the generators.

Figure 5 is a vertical section, taken on line 5—5, Fig. 4.

Figure 6 is a vertical transverse section, taken on line 6—6, Fig. 5.

Figure 7 is a section through the dump box showing the action of the dumper.

Similar reference numerals refer to similar parts in each of the several views.

In its general organization this invention comprises master control means composed of a sensitive multiplying leverage float valve and a master adjustable valve which controls the flow of cider to a master control tank, and an individual overflow baffle for each generator, which overflow baffle can be individually regulated and are also so designed that the overflow surface will not "mother up" and vary the flow of cider thereover.

The numeral 10 represents a storage tank for the alcoholic cider 11, this tank being of any suitable construction and capacity. The cider from this storage tank is discharged through an outlet pipe 12 into a float valve tank 13, the flow of cider from the outlet pipe 12 being controlled by a multiplying leverage float valve 14 and a suitable manually operated valve 15 being provided in the outlet pipe 12 to cut off the flow of cider entirely when this becomes desirable.

Any type of sensitive float valve can be employed, the multiplying leverage float valve 14 described, as best shown in Fig. 2, including a casing 16 which is screwed to the outlet pipe 12 and having an internal conical valve seat 17 and an outlet spout 18. A conical valve member 19 is mounted on a rod 20 and is movable toward and from the conical valve seat 17. To one side of the float valve tank 13 a bell crank lever 21 is mounted, the long arm of which extends upwardly and connects with the valve rod 20. The short horizontal arm of the bell crank lever 21 is connected to a long lever 22 which connects with a bracket 23 on the side of the float valve tank opposite the outlet pipe 12. Adjacent the bracket 23, the lever 22 is provided with a downwardly projecting arm 24 and to the lower end of this arm 24 is pivotally secured a relatively large float 25.

It is apparent that the lowering of the level of cider in the float valve tank 13 lowers the float 25, pulls down the lever 22 and rocks the long arm of the bell crank lever rearwardly and opens the float valves. As the level of cider in the float valve tank 13 is restored, the float 25 rises, lifts the outer end of the lever 22 and rocks the bell crank lever 21 to close the valve. Inasmuch as each of the levers is so proportioned that a very slight movement of the float in either direction opens or closes the valve, the valve is very sensitive and responds to slight differences in the level in the float valve tank. The use of such a multiplying leverage float valve thereby secures a practically constant head of cider in the float valve tank and at the same time provides a valve having orifices of such size as will not readily become clogged with mother or sediment.

From the float valve tank 13 the alcoholic cider flows through a master regulating valve 26 into a regulating or control tank 27. The master regulating valve 26 may be of any suitable construction and is adjustable to permit any desired flow of cider from the float valve tank into the regulating tank. Inasmuch as the entire feed system operates by gravity it is apparent that the regulation of the master valve 26 will simultaneously regulate the feed of all of the generators and that the regulation of the master valve will be determined by the number of generators being employed and the desired flow for each one, i. e., the flow of the master valve 26 will be regulated so as to permit exactly the flow desired for each generator multiplied by the number of generators employed.

The primary object of this invention being to secure a constant and uniform feed of cider to each generator, it is apparent that the regulating or control tank 27 is of prime importance. Should there be any slight variation in the head of cider in the float valve tank 13, this variation will not affect to any appreciable extent the amount of liquid flowing through the master valve 26, and consequently the level in the control 27. It therefore follows that the head of cider in the control tank 27 is constant except as the master valve 26 is opened or closed.

From the regulating tank 27, the cider passes into the generator supply pipes 29, these pipes 29 being preferably provided with suitable stand pipes 30 which prevent back pressure in the supply pipes. The generators 31 filled with beech wood shavings 32 are disposed in rows along opposite sides of the feed pipes 29. Each of these generators is fed with cider through an overflow baffle housing 33 which has a rubber hose or other flexible connection 34 with the branch pipes 35 on the supply pipes 29 and also a flexible connection 36 with the vertical generator feed pipes 37. These flexible connections 34 and 36 permit the overflow baffle housings 33 to be raised and lowered relative to the supply pipes and the head of cider in the controlling tank 27 to regulate the flow of cider therethrough as will presently appear.

Each of the overflow baffle housings 33 is composed of a housing 38, made of hard rubber or the like, which housing is formed to provide two laterally extending tubes 39 and 40 to which the flexible connections 34 and 36 are secured, and a central open well 41 within which is arranged an integral overflow wall or baffle 42. The cider flowing through the overflow baffle housing is required to pass over the baffle 42 and it is therefore apparent that by regulation of the vertical position of the housing 38, the flow of cider through the overflow valve can be accurately regulated. The summit of the baffle 42 is in the form of a sharp edge and hence mother or sediment cannot collect at this point and interfere with the flow of cider through the valve.

To adjustably regulate the height of each overflow baffle housing 38, the housing is formed on one side to provide a threaded ear 43 which receives a vertical screw 44. This screw is rotatably mounted in a bracket 45 and is turned by means of a knob or handle 46 at its upper end. Each of the brackets 45 is mounted on a horizontal frame bar 47 which also supports the generator feed and distributing mechanisms. It is apparent that upon turning the screws 44, the overflow baffle housings 33 will individually be raised or lowered and the flow of alcoholic cider to the individual generators accurately regulated thereby.

The generator feed and distributing mechanism may be of any suitable construction and as shown the lower end of the feed pipe 37 discharges into a dumper 52 which is pivotally mounted in a dump box 53 in such a manner that when the dumper fills with a definite quantity of cider it discharges into the dump box 53. A suitable form of dumper and dump box is shown in Fig. 7. The dump box has an outlet pipe 54 which is branched at its lower end, the branches 48 each carrying a laterally directed head which directs the cider against the vanes of a power wheel 49. This wheel 49 is fixed to a hollow rotatable shaft 50 into which the cider driving the wheel 49 flows and at its lower end this shaft carries a pair of perforated distributing arms 51 which, through their rotation, distribute the cider over the entire upper surface of the beech wood shavings 32 and thereby secure a uniform flow of alcoholic cider through the same and a uniform feeding of the bacteria with which the shavings are impregnated. A more detailed description of a generator feeding system is embodied in my copending application Ser. No. 372,065, filed June 19, 1929.

It is apparent from the foregoing that by a precise and accurate regulation of the head in the float valve chamber, a master valve flow regulation of the group of generators and individual overflow valve regulation of the individual generators, an extremely accurate and continued regulation of the feeding of the generators is obtained and as this continued accuracy of flow avoids the danger of losses of alcohol through failure to convert when the flow is too fast, or the conversion of the acetic acid into useless products when the flow is too slow, a better yield and better quality of vinegar can be obtained with a consequent saving in the cost of production of the same. The baffle housings in this system are also so designed that they will not readily mother up or become clogged so as to affect the flow of cider through the same. The system is moreover simple and inexpensive to install and regulate and when once regulated will operate without substantial variation to provide the desired flow to the generators.

I claim as my invention:

1. A system for controlling the feeding of vinegar generators or the like, comprising fluid supply means, gravity means for conducting the fluid from said supply means to said generators, means for regulating the flow of fluid from said supply means to said conducting means, an overflow fluid controlling member controlling the flow of fluid from said conducting means to each of said generators each of said overflow fluid controlling members including baffle means over which the fluid is required to flow, flexible connections between said overflow fluid controlling members and said conducting means, and screw means for adjustably raising and lowering each of said overflow fluid controlling members to regulate the overflow of fluid therethrough.

2. A system for controlling the feeding of vinegar generators or the like, comprising a controlling tank, an adjustable master controlling valve discharging into said tank, means for maintaining a constant flow of fluid through said master valve in any adjusted position thereof, conduits conducting the fluid by gravity from said controlling tank to the generators, an overflow fluid controlling member controlling the flow of fluid from each of said conduits to the respective generator, each of said overflow fluid controlling members including baffle means over which the fluid is required to flow, and means for adjusting the elevation of each of said baffle means to regulate the overflow of fluid therethrough.

3. A system of controlling the feeding of vinegar generators or the like, comprising a float valve tank, means for supplying fluid to said float valve tank, a float valve in said float valve tank and maintaining a constant level therein, a controlling tank, an adjustable master valve controlling the flow of fluid from said float valve tank to said controlling tank and maintaining a constant adjusted level in said controlling tank, conduits conducting the fluid by gravity from said controlling tank to the generators, an overflow fluid controlling member controlling the flow of fluid from each of said conduits to the respective generator, each of said overflow fluid controlling members including baffle means over which the fluid is required to flow, and means for adjusting the elevation of each of said baffle means to regulate the overflow of fluid therethrough.

4. In a system for controlling the feeding of vinegar generators or the like, an overflow fluid controlling member, comprising a baffle housing, a baffle in said housing over which the fluid is required to flow, an inlet and an outlet for said housing, and means for adjustably regulating the elevation of said baffle.

5. In a system for controlling the feeding of vinegar generators or the like, an overflow fluid controlling member comprising a baffle housing, a baffle rising from the bottom of said housing and obstructing the flow of fluid therethrough, said baffle being formed with a pointed upper edge, an inlet and an outlet for said housing and means for adjustably regulating the elevation of said baffle.

6. In a system for controlling the feeding of vinegar generators or the like, an overflow fluid controlling member comprising a housing formed to provide an inlet and an outlet, flexible connections for said inlet and said outlet, a baffle rising from the bottom of said housing and obstructing the flow of fluid therethrough, said baffle being formed with a pointed upper edge and said housing being formed to provide an opening above said baffle, and means for adjustably raising and lowering said housing to regulate the flow of fluid over said baffle.

7. A system for controlling the feeding of vinegar generators or the like, comprising fluid supply means, means for conducting the fluid from said supply means to the generators, means for regulating the flow of fluid through said conducting means, and a plurality of adjustable overflow fluid controlling members said overflow fluid controlling members each including baffle means, and means for regulating the elevation of said baffle means to control the feeding of each individual generator.

8. A system for controlling the feeding of vinegar generators or the like, comprising fluid supply means, gravity means for conducting the fluid from said supply means to said generators, means for regulating the flow of fluid from said supply means to said conducting means, an overflow fluid controlling member controlling the flow of fluid from said conducting means to each of said generators, each of said overflow fluid controlling members including baffle means over which the fluid is required to flow, flexible connections between said overflow fluid controlling members and said conducting means, and means for adjustably raising and lowering each of said overflow fluid controlling members to regulate the overflow of fluid therethrough.

9. A system for controlling the feeding of vinegar generators or the like, comprising liquid supply means, means for conducting the liquid from said supply means to the generators, means for regulating the flow of liquid through said conducting means and an adjustable overflow liquid controlling member for each generator in said conducting means, each of said overflow members comprising a body having a conduit a wall of which rises to form an overflow elevation, means for admitting air to said conduit above said overflow elevation and means for regulating the elevation of the lower wall of said conduit to control the overflow of the liquid and the feeding of each individual generator.

In testimony whereof I hereby affix my signature.

ALFRED W. HINCHLIFFE.